(No Model.)

E. HABERMANN.
GALVANIC BATTERY.

No. 600,719. Patented Mar. 15, 1898.

Witnesses
Albert Leiden
Ralph L. Warfield

Inventor:
Emil Habermann
per Rhesa G. DuBois
Attorney

UNITED STATES PATENT OFFICE.

EMIL HABERMANN, OF MICHIGAN CITY, INDIANA.

GALVANIC BATTERY.

SPECIFICATION forming part of Letters Patent No. 600,719, dated March 15, 1898.

Application filed October 7, 1897. Serial No. 654,395. (No model.)

*To all whom it may concern:*

Be it known that I, EMIL HABERMANN, a citizen of the United States, residing at Michigan City, in the county of La Porte and State of Indiana, have invented certain new and useful Improvements in Galvanic Batteries; and I do declare the following to be a full, clear, and exact description of the invention, such as will enable others skilled in the art to which it appertains to make and use the same, reference being had to the accompanying drawings, and to the figures and letters of reference marked thereon, which form a part of this specification.

My object is to provide a primary electric battery of extremely cheap and simple construction in which a fresh supply of exciting fluid will be constantly presented to the elements and the exhausted fluid withdrawn therefrom, so that the voltage and amperage will be maintained constant and which may be maintained at small expense.

A further object is the provision of an improved primary battery capable of easy adjustment to increase or diminish its current.

Having the foregoing and other objects in view, the invention consists of positive and negative battery elements and improved means for constantly presenting a fresh supply of the exciting fluid thereto and removing the exhausted fluid therefrom, and it further consists of improved means for regulating the supply of the exciting fluid to the elements.

The invention still further consists of certain improved features and combinations of parts more fully described hereinafter and pointed out in the claims.

Figure 1:
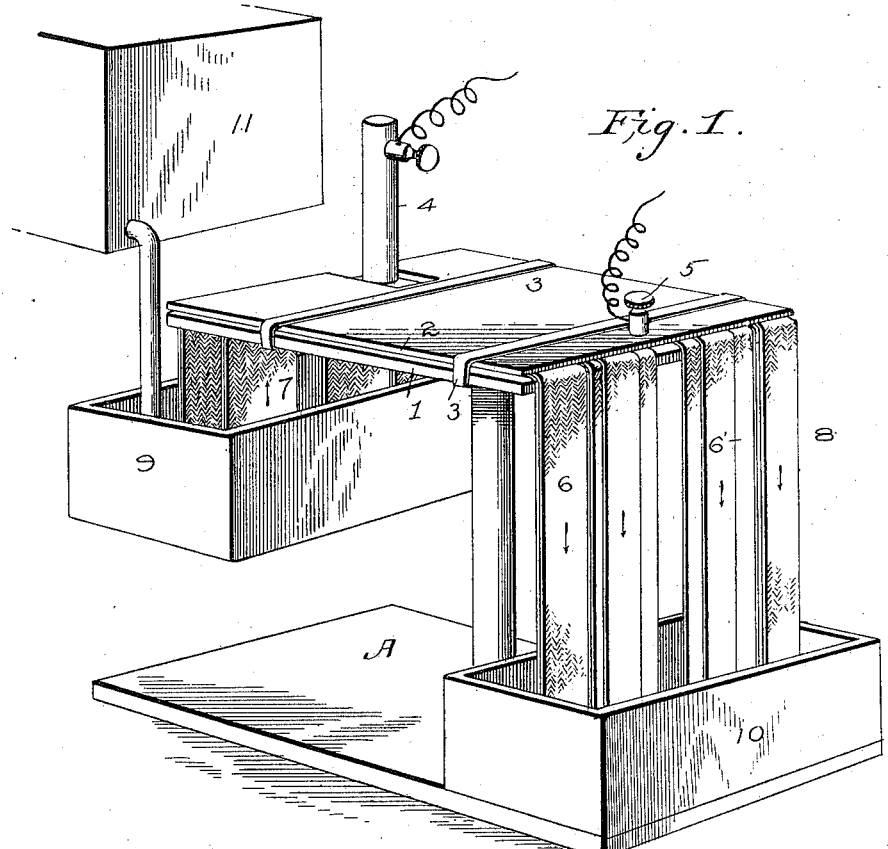
Figure 2:
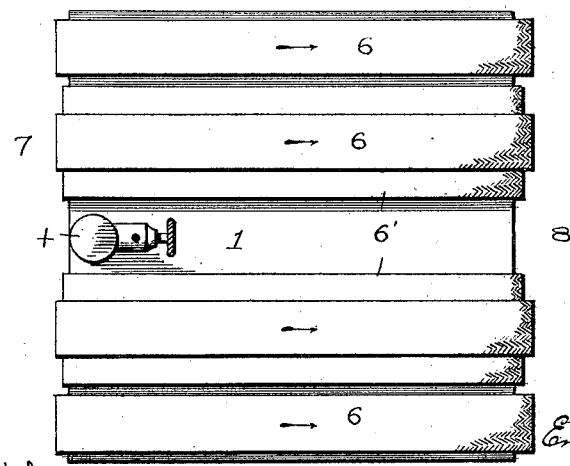

In the accompanying drawings, Figure 1 is a perspective view of my complete battery; and Fig. 2 a detail plan view with the positive element removed, disclosing the wicks.

I employ a stand A for supporting the various parts of my battery. The battery elements consist of superposed flat plates 1 and 2, preferably of carbon and zinc, respectively, which are secured together by elastic bands 3. A pillar 4, having a binding-post at its top, arises from the carbon plate, and the zinc plate is provided with a binding-post 5 at its center. There are a series of flat wicks 6, arranged in pairs, which lie between the positive and negative elements 1 and 2. It will be observed that two of the wicks 6' are broader than the others, and while practically the whole area of the carbon element is covered parts of the zinc element are not covered by the wicks. This is for the purpose of preventing polarization of the battery. The wicks are disposed in pairs, so that either wick of a given pair can be removed when a current of less strength is desired. The ends of the wicks depend from opposite sides of the battery elements, but are shorter at one end 7 than at the other end 8. A feed cup or jar 9 receives the short ends 7 of the wicks, and the long ends 8 are received in a discharge-cup 10, these cups being supported at different heights on the stand. It is desirable to employ a reservoir 11, which empties at a predetermined rate into the feed-cup, so that the height of the fluid in the latter may be kept constant.

Any suitable exciting fluid can be used with my battery if it will not damage or destroy the absorbent wicks, and I find sal-ammoniac and rock-salt solutions very efficient.

The exciting fluid is introduced into the reservoir, from which it passes into the feed-cup. The wicks should be first dampened with water and will then draw the exciting fluid from the feed-cup to the battery elements, after which it will pass into the discharge-cup. The exciting fluid, it will be observed, is being constantly offered to the elements by capillary attraction and the supply is necessarily a regular one, while the fluid is kept in contact with the elements until its usefulness is gone, and when it passes from the plates it is exhausted or dead. As a fresh supply of the exciting fluid is constantly being offered to the elements and the exhausted fluid removed the voltage and amperage of the battery remain practically constant. It is clear that the active area of the battery elements is that only which is in contact with the wicks. Consequently by removing one or more wicks the quantity of fluid supplied to the elements is diminished and the current can be varied as desired, which is a great advantage. If desirable, means can be employed for raising the negative or zinc element when the battery is not in use.

Various slight changes could be resorted to in carrying out the present invention without detracting from any of its advantages, and hence I consider myself entitled to all such modifications as come within the spirit and scope of this invention.

Having thus described my invention, what I claim as new, and desire to secure by Letters Patent, is—

1. In an electric battery, the combination with superposed battery elements, of a wick disposed between and in contact with both elements, and an exciting fluid isolated from the elements and in which a portion of the wick is immersed, substantially as described.

2. In a electric battery, the combination with battery elements, and an isolated exciting fluid, of a plurality of removable wicks located between the elements and leading from the fluid to the elements thereby affording means for varying the power of the battery, substantially as described.

3. In a galvanic battery, the combination with positive and negative battery elements, of an isolated electrolyte, and a capillary wick located between and in contact with the elements, and having one end extending into the electrolyte and the other end away from the elements, substantially as described.

4. In an electric battery, the combination with battery elements, and an exciting fluid isolated from the elements of separate superposed independently-removable wicks located between the elements in contact therewith and leading from the exciting fluid, whereby the latter is fed to the elements by capillarity, substantially as described.

5. In an electric battery, the combination with battery elements, and an exciting fluid isolated from the elements, of separate, superposed, independently-removable wicks of different sizes located between the elements and respectively in contact with them, said wicks leading from the exciting fluid, substantially as described.

6. In an electric battery, the combination with superposed battery elements, of a feeding-cup, an exciting fluid in the feed-cup, a discharge-cup and wicks located between the elements and extending from side to side thereof, and having their ends received in the fluid and the discharge-cup, respectively, substantially as described.

7. In a galvanic battery, the combination with positive and negative battery elements, of a feed-receptacle containing an electrolyte isolated from the elements, a discharge-receptacle, and a capillary wick located between and in contact with said elements, the opposite ends of the wick being extended into the feed and discharge receptacles, respectively, substantially as described.

In witness whereof I affix my signature in presence of two witnesses.

EMIL HABERMANN.

Witnesses:
C. E ARNT,
J. C. PITSCH.